(12) United States Patent
Kitahara

(10) Patent No.: US 7,610,753 B2
(45) Date of Patent: Nov. 3, 2009

(54) EXHAUST GAS PURIFICATION APPARATUS FOR INTERNAL COMBUSTION ENGINE AND METHOD THEREOF

(75) Inventor: Yasuhisa Kitahara, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 6 days.

(21) Appl. No.: 10/332,239

(22) PCT Filed: Apr. 17, 2002

(86) PCT No.: PCT/JP02/03835

§ 371 (c)(1),
(2), (4) Date: Jan. 6, 2003

(87) PCT Pub. No.: WO02/086301

PCT Pub. Date: Oct. 31, 2002

(65) Prior Publication Data

US 2005/0072141 A1    Apr. 7, 2005

(30) Foreign Application Priority Data

Apr. 19, 2001    (JP) .............................. 2001-121481

(51) Int. Cl.
*F01N 3/00* (2006.01)
(52) U.S. Cl. ............................. 60/295; 60/274; 60/276; 60/297; 60/311
(58) Field of Classification Search ................... 60/274, 60/285, 295, 297, 311, 276
See application file for complete search history.

(56) References Cited

U.S. PATENT DOCUMENTS

| | | | |
|---|---|---|---|
| 4,211,075 A | * | 7/1980 | Ludecke et al. ............... 60/285 |
| 4,535,588 A | * | 8/1985 | Sato et al. ...................... 60/286 |
| 4,747,264 A | * | 5/1988 | Santiago et al. ............... 60/274 |
| 4,835,964 A | * | 6/1989 | Kume et al. ................... 60/285 |
| 5,050,376 A | | 9/1991 | Stiglic et al. |

(Continued)

FOREIGN PATENT DOCUMENTS

EP    0 758 713 A1    2/1997

(Continued)

OTHER PUBLICATIONS

Patent Abstracts of Japan, vol. 011, No. 397 (M-655), Dec. 25, 1987, JP 62-162762.

(Continued)

*Primary Examiner*—Thomas E Denion
*Assistant Examiner*—Diem Tran
(74) *Attorney, Agent, or Firm*—Foley & Lardner LLP

(57) ABSTRACT

According to the present invention, there is disposed in an exhaust passage of an internal combustion engine a filter that traps particulate matter In an exhaust gas, and a catalyst with a three-way function is carried on the filter. At the filter regeneration, by controlling such as an injection amount of post injection, an air-fuel ratio of the exhaust gas at an outlet of the filter is controlled to a stoichiometric ratio, and also by controlling such as an intake air throttle valve, an oxygen concentration of the exhaust gas at an inlet of the filter is controlled. Hence, at the filter regeneration, the particulate can be reliably burned and removed, and at the same time, NOx in addition to HC and CO can be purified.

26 Claims, 11 Drawing Sheets

U.S. PATENT DOCUMENTS

| | | | |
|---|---|---|---|
| 5,067,973 A | | 11/1991 | Pattas |
| 5,207,990 A | * | 5/1993 | Sekiya et al. ............... 422/183 |
| 5,908,480 A | * | 6/1999 | Ban et al. .................... 55/482 |
| 6,233,927 B1 | * | 5/2001 | Hirota et al. ................. 60/297 |
| 6,367,246 B1 | * | 4/2002 | Hirota et al. ................. 60/295 |

FOREIGN PATENT DOCUMENTS

| | | | |
|---|---|---|---|
| EP | 0 806 553 A2 | | 11/1997 |
| JP | 61-146314 | * | 7/1986 |
| JP | 9-053442 A | | 2/1997 |
| JP | 2858184 B2 | | 12/1998 |
| JP | 2000-303878 | | 10/2000 |
| JP | 2001-098928 | | 4/2001 |
| KR | 1998-047886 U | | 9/1998 |

OTHER PUBLICATIONS

Patent Abstracts of Japan, vol. 009, No. 235 (M-415), Sep. 21, 1985, JP 60-090931.

* cited by examiner

EXHAUST PRESSURE THRESHOLD VALUE OF DPF

TARGET INTAKE AIR AMOUNT FOR REGENERATION CONTROL

TARGET POST INJECTION QUANTITY FOR REGENERATION CONTROL

TARGET INTAKE AIR AMOUNT FOR PROTECTING DPF FROM MELT

TARGET EGR RATE FOR REGENERATION CONTROL

TARGET INTAKE AIR AMOUNT FOR RAPID TEMPERATURE RISE OF DPF

EXHAUST GAS PURIFICATION APPARATUS FOR INTERNAL COMBUSTION ENGINE AND METHOD THEREOF

TECHNICAL FIELD

The present invention relates to an exhaust gas purification apparatus for an internal combustion engine and a method thereof, and particularly to a regeneration treatment technology of a filter that traps particulate matter being fine grains in an exhaust gas.

BACKGROUND ART

Heretofore, when a filter that traps particulate matter in an exhaust gas is located at an exhaust passage as an exhaust gas purification apparatus, regeneration treatment of the filter is required (treatment to burn and remove the particulate matter trapped in the filter).

Japanese Patent No. 2858184 includes a heating unit that heats particulate matter to an initial temperature of a filter and a particulate trapping amount of the filter, a gas supply unit that supplies a gas including an oxygen for promoting the burning of heated particulate matter, a filter temperature detection unit that detects a side temperature of the filter, and a control unit that controls an operation starting time and/or a gas supply amount of the gas supply unit based upon a signal of the filter temperature detection unit during a heating process of the particulate matter by the heating unit.

DISCLOSURE OF THE INVENTION

In the technology disclosed in the above Japanese Patent, an amount of oxygen (air for regeneration) flowing into the filter is controlled so that the filter is not melted due to the burning of the particulate matter trapped in the filter being too high. However, in a system where a total amount of the exhaust gas flows in the filter all the time, when the regeneration is carried out only in oxygen atmosphere, HC, CO are purified, but NOx is not purified.

The present invention, from the foregoing problem, has an object of providing an exhaust gas purification apparatus for an internal combustion engine and a method thereof, capable of effectively purifying also NOx at the filter regeneration.

In order to achieve the object, according to the present invention, a filter that traps particulate matter in an exhaust gas is disposed in an exhaust passage of an engine, and a catalyst with a three-way function is carried on the filter. Then, at the filter regeneration, an air-fuel ratio of the exhaust gas at an outlet of the filter is controlled to be at a stoichiometric ratio.

At the non-regeneration of the filter, the air-fuel ratio of the exhaust gas at an inlet of the filter is equivalent to that at the outlet of the filter. Whereas, at the regeneration of the filter, the air-fuel ratio of the exhaust gas at the inlet of the filter is different from that at the outlet of the filter because the oxygen in the exhaust gas is consumed due to the burning of the particulate matter in the filter. Accordingly, the air-fuel ratio of the exhaust gas at the outlet of the filter is controlled to a stoichiometric ratio and as a result, the air-fuel ratio at the inlet of the filter is on a lean side (high oxygen concentration).

The other object and features of this invention will become understood from the following description with the accompanying drawings.

DETAILED DESCRIPTION OF THE INVENTION

Embodiments according to the invention will be explained with reference to the drawings.

Figure 1:
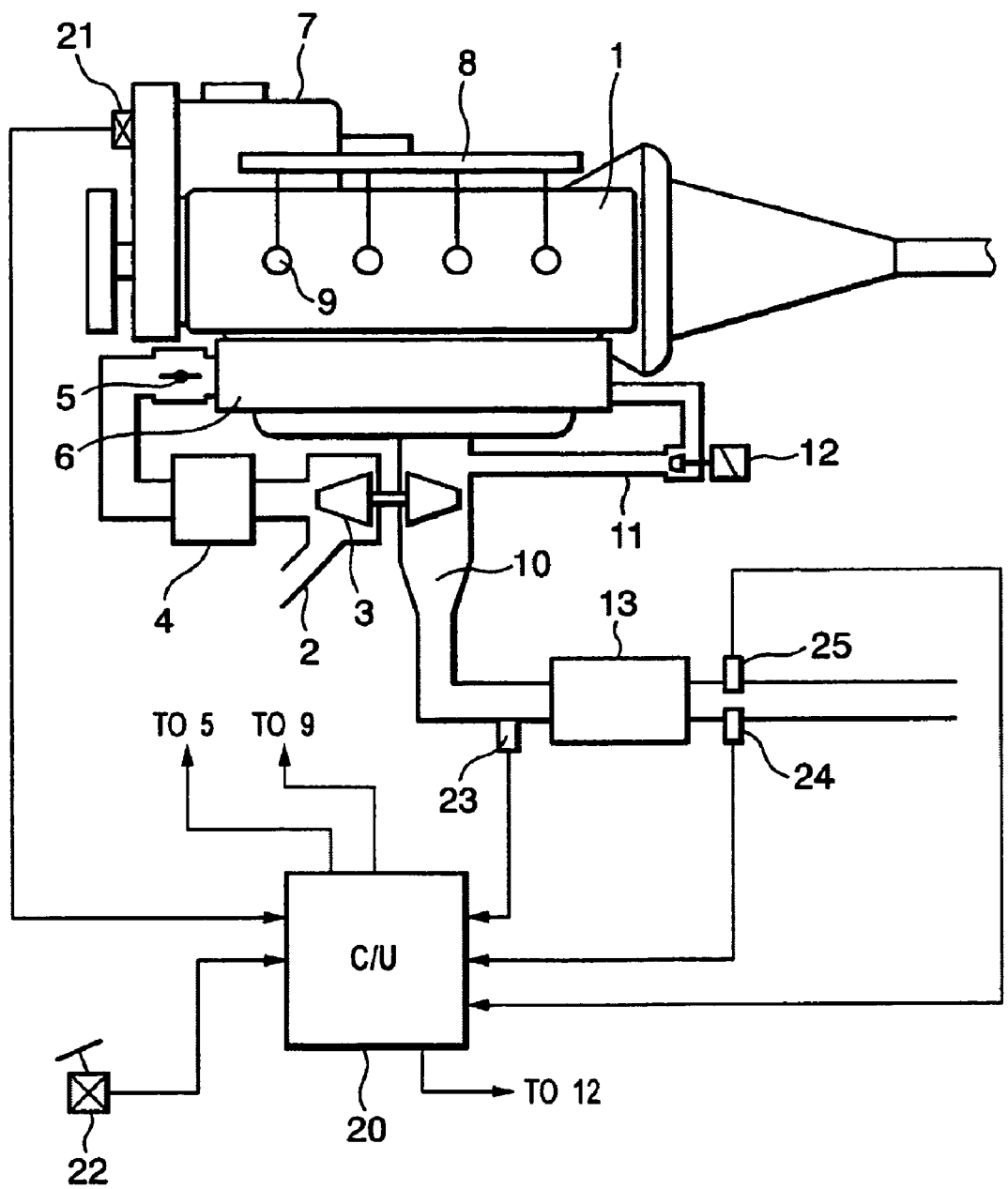
FIG. 1 is a system diagram of an engine in a first embodiment according to the present invention.

FIG. 1 Is a system diagram of an internal combustion engine (a diesel engine herein) showing a first embodiment according to the present invention.

In a diesel engine 1, air sucked into an intake pipe 2 is supercharged by an intake compressor of a variable nozzle type turbocharger 3, cooled by an inter-cooler 4, then passes through an intake air throttle valve 5 and afterwards, flows into a combustion chamber of each cylinder via a collector 6. Fuel is pressured by a high pressure fuel pump 7 to be sent to a common rail 8, and is directly injected into the combustion chamber from a fuel injection valve 9 of each cylinder. The air flown into the combustion chamber and the fuel injected into the combustion chamber are combusted herein by compression ignition, and an exhaust gas flows out into an exhaust passage 10.

A part of the exhaust gas flown out into the exhaust passage 10 is recirculated to an intake side via an EGR control valve 12 through an EGR pipe 11. The remaining exhaust gas passes through an exhaust gas turbine of the variable nozzle type turbocharger 3 to drive it.

A diesel particulate filter (to be referred to as DPF hereinafter) 13 that traps particulate matter (to be referred to as PM hereinafter), is disposed downstream of the exhaust gas turbine of the exhaust passage 10, for exhaust gas purification.

This DPF 13 carries a precious metal catalyst to form a DPF with a three-way function, to oxidize HC and CO in the exhaust gas, and also to reduce NOx.

On the other hand, since an increase in an amount of PM trapped (accumulated), that is, an accumulated PM amount, in the DPF 13 brings an increase of an exhaust back pressure to thereby deteriorate fuel economy, it is required for the DPF 13 to be regenerated by burning and removing the PM accumulated at each certain period of time.

A control unit 20 is input with signals such as from a rotation speed sensor 21 for an engine rotation speed Ne detection and an accelerator pedal opening sensor 22 for an accelerator pedal opening APO detection, in order to control the engine 1.

Particularly, in this embodiment, an exhaust gas pressure sensor 23 is disposed on an inlet side of the DPF 13 in the exhaust passage 10, and an oxygen concentration sensor 24 and an exhaust gas temperature sensor 25 are disposed on an outlet side of the DPF 13, signals from which being input to the control unit 20.

The control unit 20, based upon these signals, outputs a fuel injection command signal to the fuel injection valve 9 for controlling fuel injection quantities and injection timing, of the main injection by the fuel injection valve 9 and of the post injection to be additionally made during an expansion stroke (or an exhaust stroke) after the main fuel injection in a predetermined engine operating condition, an opening angle command signal to the intake throttle valve 5, an opening angle command signal to the EGR control valve 12, and the like.

Particularly, in the present invention, it is judged whether or not the regeneration of the DPF 13 is required to perform a predetermined regeneration treatment when it is the regeneration timing. The DPF regeneration control will be explained in detail as follows.

Figure 2:
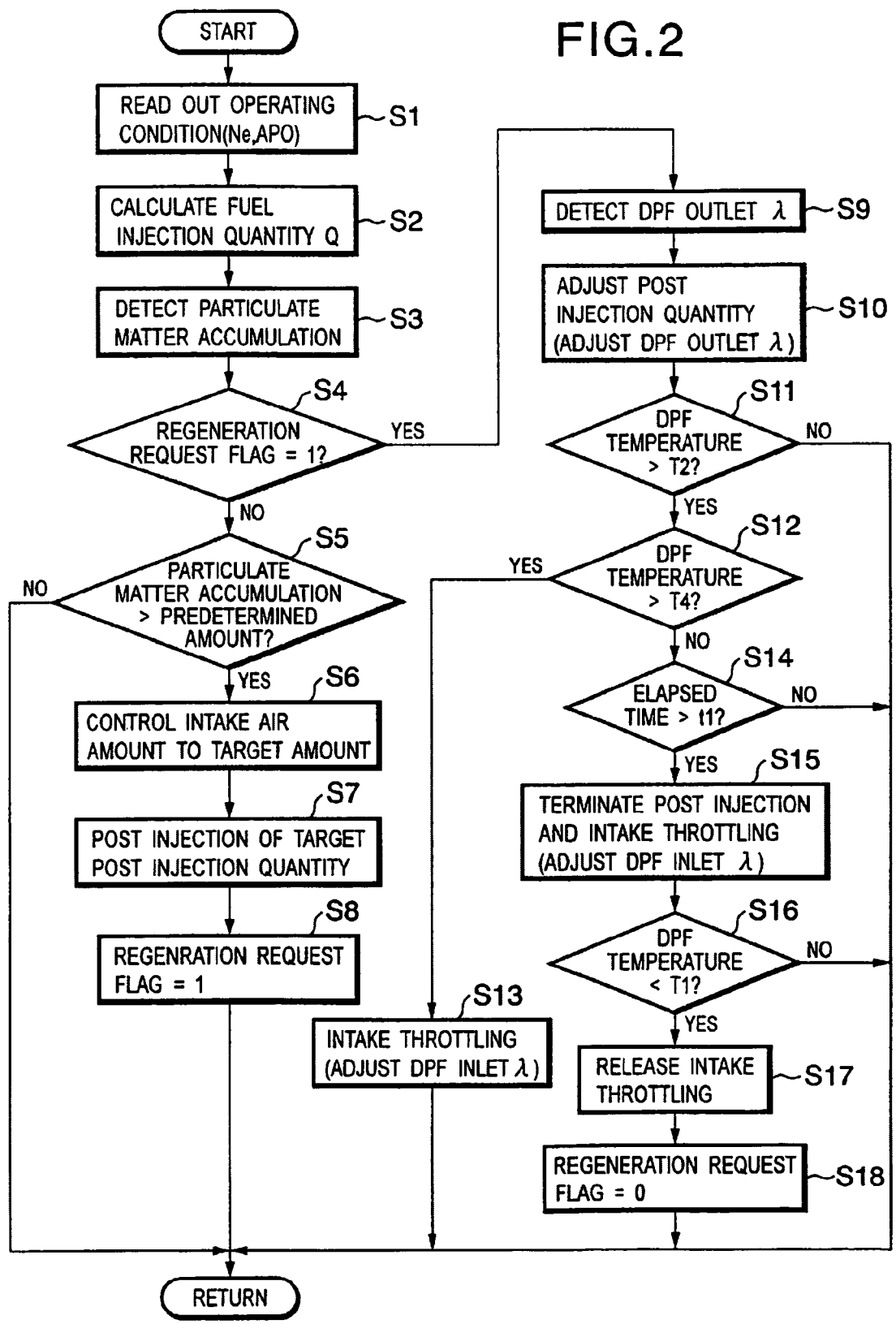
FIG. 2 is a flowchart of a diesel particulate filter (DPF) regeneration control in the first embodiment.

FIG. 2 is a flowchart of the DPF regeneration control to be executed at the control unit 20.

At S1, an engine operating condition (engine rotation speed Ne and accelerator pedal opening APO) is read out from the rotation speed sensor 21 and the accelerator pedal opening sensor 22.

At S2, a fuel injection quantity Q for the main injection is calculated from a map (not shown in the figure) using the engine rotation speed Ne and the accelerator pedal opening APO as parameters thereof.

At S3, an accumulated PM amount of the DPF 13 is detected for judgment of the regeneration timing of the DPF 13. Since it is difficult to directly detect the accumulated PM amount of the DPF 13, here, an exhaust gas pressure upstream of the DPF 13 is detected by the exhaust gas pressure sensor 23, based upon the fact that as the accumulated PM amount of the DPF 13 increases, the exhaust gas pressure upstream of the DPF 13 rises up.

At S4, it is judged whether or not a regeneration request flag is equal to 1. If the regeneration request flag is 0, the control goes to S5, while if the regeneration request flag is 1, the control goes to S9 for continuation of the regeneration mode.

At S5, it is judged whether or not the accumulated PM amount of the DPF 13 exceeds a predetermined amount. The predetermined amount in this embodiment is an amount at about 80% of the accumulated PM amount capable of accumulating on the DPF 13, and also is a constant amount. In a case where the accumulated PM amount of the DPF 13 is indirectly detected based upon the exhaust gas pressure upstream of the DPF 13, it is judged whether or not the exhaust gas pressure upstream of the DPF 13 exceeds a predetermined exhaust pressure threshold value ACC1. The exhaust pressure threshold value ACC1 to be used herein is set by a map shown in FIG. 3, that is, a map using the engine rotation speed Ne and the fuel injection quantity Q as parameters thereof.

Figure 3:
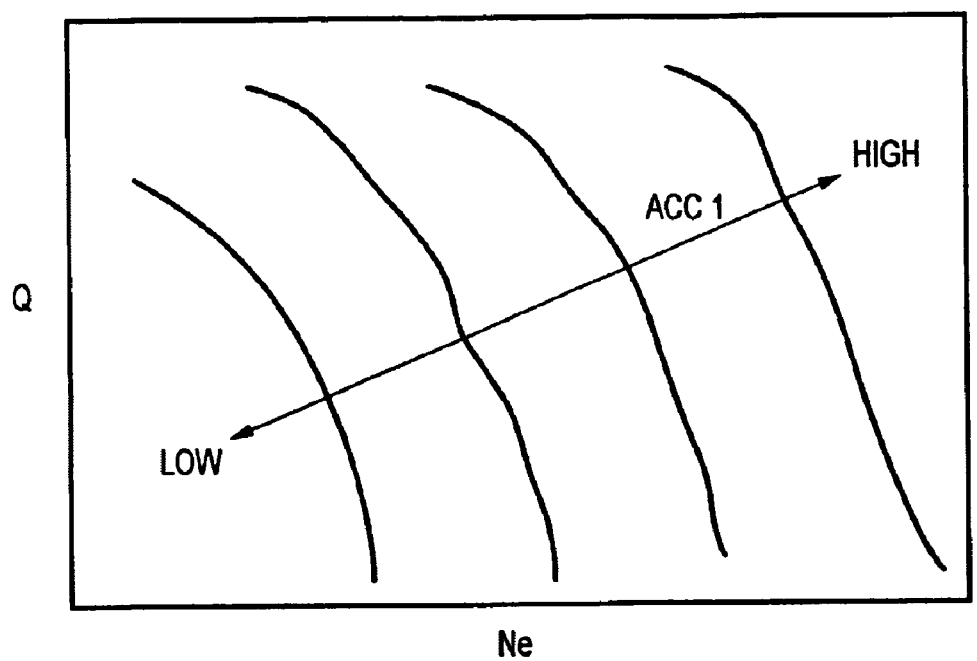
FIG. 3 is a map of an exhaust gas pressure threshold value for a regeneration timing judgment.

Namely, if the exhaust gas pressure in the current operating condition (Ne, Q) does not exceed the exhaust pressure threshold value ACC1 in the corresponding operating condition in FIG. 3, it is judged that it is not yet the regeneration timing and the control returns. Whereas, if the exhaust gas pressure in the current operating condition (Ne, Q) exceeds the exhaust pressure threshold value ACC1 in the corresponding operating condition in FIG. 3, it is judged that the accumulated PM amount of the DPF 13 exceeds the predetermined amount and it is the regeneration timing, and the control goes to the regeneration mode of S6 and the subsequent steps.

Figure 4:
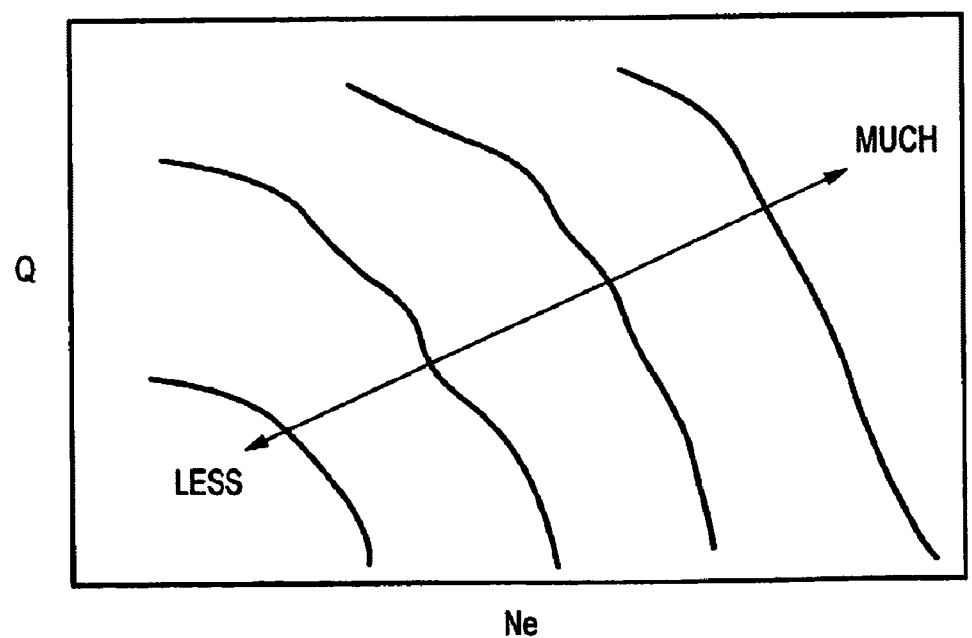
FIG. 4 is a map of a target intake air amount for a regeneration control.

At S6, to start the regeneration of the DPF 13, an opening angle of the intake air throttle valve 5 is controlled to adjust an intake air amount (an air amount sucked into a cylinder per unit time) to a target intake air amount corresponding to the accumulated PM amount of the DPF 13. Specifically, from a target intake air amount map shown in FIG. 4, a target intake air amount corresponding to the current operating condition (engine rotation speed Ne and fuel injection quantity 0) is determined and the opening angle of the intake air throttle valve 5 is adjusted so as to obtain the determined target intake air amount The target intake air amount is set in such an amount corresponding to a target oxygen concentration at the inlet of the DPF. The target oxygen concentration is set within a range where an oxygen concentration is higher than an oxygen concentration enough for burning the PM, and lower than an oxygen concentration within which even if the accumulated PM amount is burned, a temperature of the DPF does not rise up excessively. In this embodiment, since it is judged that it is the regeneration timing when the accumulated PM amount reaches the predetermined PM amount (predetermined constant amount), R can be assumed that the accumulated PM amount at the regeneration timing is the predetermined constant amount. Therefore, the target oxygen concentration can be set to be a constant concentration corresponding to the predetermined constant amount. Thus, an oxygen concentration sensor may be disposed at the inlet of the DPF 13 whereby the opening angle of the intake air throttle valve is controlled to obtain a target oxygen concentration.

Figure 5:
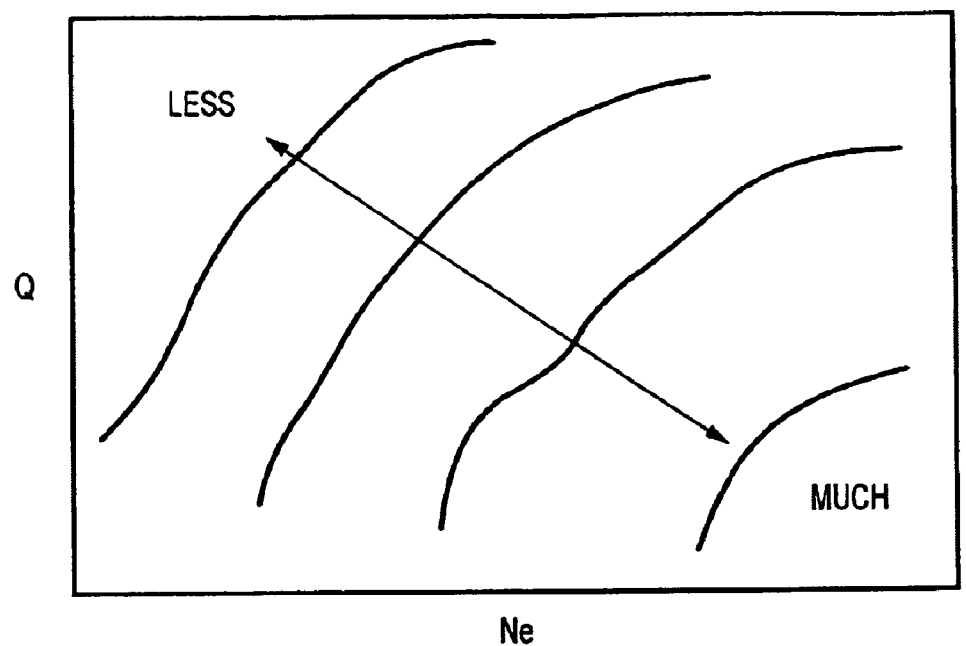
FIG. 5 is a map of a target post injection amount for the regeneration control.

At S7, the post injection is started, which is the additional injection during the expansion stroke after the main injection. At this time, a target post injection amount corresponding to the current operating condition (engine rotation speed Ne and fuel injection quantity Q) is determined from a post injection amount map shown in FIG. 5 and the target post injection amount is injected at a predetermined post injection timing. The post injection amount at this time is set to a value that the exhaust gas air-fuel ratio at the outlet of the DPF 13 is a stoichiometric ratio (DPF outlet $\lambda=1$), and also that an exhaust gas temperature enabling the regeneration of the DPF 13 is obtained. The post injection itself is disclosed in Japanese Unexamined Patent Publication 9-53442 (page 4).

At S8, the regeneration request flag is set to 1, and the control returns.

When the regeneration request flag=1, the control goes to S9 and the subsequent steps based upon the judgment at S4.

At S9, based upon a signal from the oxygen concentration sensor 24 disposed on the outlet side of the DPF 13, the exhaust gas air-fuel ratio at the outlet of the DPF 13 (DPF outlet $\lambda$) is detected.

At S10, based upon the detected exhaust gas air-fuel ratio at the outlet of the DPF 13 (DPF outlet $\lambda$), the post injection amount is feedback controlled, so that the exhaust gas air-fuel ratio becomes the stoichiometric ratio (DPF outlet $\lambda=1$).

At S11, a temperature of the DPF 13 is directly or indirectly detected and it is judged whether or not the temperature has reached a temperature T2 (about 650° C.) at which the PM can be burned. Herein, the temperature of the DPF 13 is indirectly detected based upon a signal from the exhaust gas temperature sensor 25 disposed on the outlet side of the DPF 13. When it is judged that the temperature of the DPF 13 does not reach T2, the control returns, while when it is judged that the temperature of the DPF 13 reaches T2, the control goes to S12.

At S12, it is judged whether or not the temperature of the DPF 13 exceeds a predetermined upper limit temperature, namely, a temperature maintaining the heat resistance of the DPF, T4 (T4>T2). When exceeding, since there is a possibility that the DPF 13 is melted, the control goes to S13 wherein the oxygen concentration at the inlet of the DPF 13 is lowered by throttling the opening angle of the Intake air throttle valve 5, thereby restraining the burning of the PM inside the DPF 13 and then, lowering the temperature of the DPF 13 to T4 or less. When the DPF 13 temperature is less than T4, the control goes to S14.

At S14, since the DPF 13 is within a temperature range between T2 and T4, suitable for burning the PM, an elapsed time in this condition is determined. When the elapse time is a predetermined time t1 or less, the control returns. Accordingly, after the DPF 13 is regenerated for the predetermined time t1 (in the order of a few seconds to a few minutes) while maintaining the burning condition of the PM, the control goes to S15. The predetermined time ti herein is a period of time required so that the PM accumulated in the DPF 13 can be burned. In this embodiment, since it is judged that it is the regeneration timing when the accumulated PM amount of the DPF 13 reaches the predetermined constant amount, it can be assumed that the accumulated PM amount at the regeneration timing is the predetermined constant amount Therefore, it is enough to set to as a constant value that is not affected by the operating condition.

Figure 6:
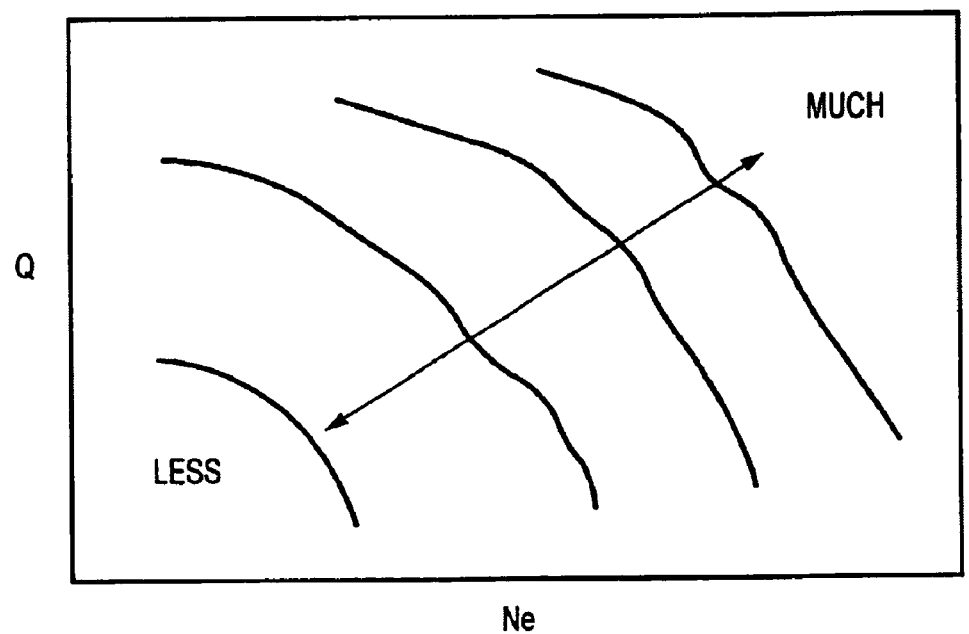
FIG. 6 is a map of a target intake air amount for the DPF protection against the melting.

At S15, the post injection is ended to terminate the temperature rise of the DPF 13. As for the intake air throttle valve 5, from a target intake air amount map for protecting the DPF from the melting shown in FIG. 6, a target intake air amount corresponding to the current operating condition (engine rotation speed Ne and fuel injection quantity Q) is determined, and the opening angle of the intake air throttle valve 5 is adjusted to throttle the intake air, so as to obtain the determined target intake air amount. As a result, the oxygen concentration at the inlet in the DPF 13 is adjusted, preventing the melt of the DPF 13. In this case, an oxygen concentration sensor may be disposed at the inlet of the DPF 13, whereby the intake throttling is controlled so as to obtain the target oxygen concentration.

At S16, the temperature of the DPF 13 is detected and it is judged whether or not the temperature is lowered to the temperature T1 where the PM cannot be burned. When it is not lowered to the temperature T1, the control returns. This is because the intake throttling is continued until the DPF 13 temperature reaches the temperature T1 where the PM cannot be burned, so as to restrain the rapid burning of the PM that have been remained in the DPF without burned. When the DPF 13 temperature is lowered to T1, the control goes to S17.

At S17, the intake throttling by the intake air throttle valve 5 is released.

At S18, since all regeneration operations are ended, the regeneration request flag is set to 0 and this routine is ended.

In this embodiment, when a catalyst with a three-way function is used, by controlling the exhaust gas air-fuel ratio at the outlet of the DPF 13 to the stoichiometric ratio (control of post injection amount) at the regeneration period, a three-way effect is achieved, so that HC, CO, and Nox are purified at the outlet and inside of the DPF 13. Incidentally, the exhaust gas air-fuel ratio at the outlet of the DPF 13 is assumed to be equivalent to that inside of the DPF 13.

At the regeneration period, since the oxygen in the exhaust gas is consumed by the burning of the PM inside of the DPF 13, the exhaust gas air-fuel ratio at the inlet of the DPF 13 is different from that at the outlet of the DPF 13. By controlling the exhaust gas air-fuel ratio at the outlet side to the stoichiometric ratio, the air-fuel ratio at the inlet side becomes lean (high oxygen concentration). Therefore, an oxygen amount enough for burning the PM can be supplied to the inlet of the DPF 13 and the PM trapped in the DPF 13 can also be burned reliably.

Namely, in the DPF with the catalyst with the three-way function, since the PM is trapped on a surface of a catalyst layer, when the exhaust gas passes through the DPF 13 at the regeneration of the DPF 13, the exhaust gas reaches the catalyst layer after the oxygen is consumed by the PM. Therefore, by controlling the air-fuel ratio at the outlet to the stoichiometric ratio (controlling $\lambda$ at the inlet side to be lean and $\lambda$ at the outlet side to be the stoichimetric ratio), the PM can be burned by the oxygen and afterwards, NOx can be purified by the stoichiometric ratio (three-way atmosphere).

According to this embodiment, moreover, by controlling the oxygen concentration at the inlet of the DPF 13 (control of the intake throttling), it becomes possible to control properly the oxygen concentration at the inlet of the DPF 13 to the extent that the exhaust gas air-fuel ratio at the outlet of the DPF 13 can be controlled to the stoichiometric ratio, to perform the regeneration of the DPF 13 efficiently.

Further, according to this embodiment, when the inlet side oxygen concentration is controlled, the oxygen concentration of the exhaust gas at the inlet of the DPF 13 is controlled corresponding to the PM amount trapped in the DPF, namely, the oxygen concentration at the inlet of the DPF 13 is determined corresponding to the PM amount trapped in the DPF 13 to control the burning speed of the PM based upon the determined oxygen concentration, so that the excessive temperature rise of the DPF 13 can be restrained to perform the DPF regeneration without the melting, cracking or the like of the DPF 13.

Moreover, according to this embodiment, there is provided a filter temperature detector (exhaust gas temperature sensor 25), and when the DPF temperature during regeneration exceeds the predetermined value (T4) for some reason at the control of the inlet side oxygen concentration, by lowering the exhaust gas oxygen concentration at the inlet of the DPF 13, the burning heat of PM, and HC and CO can be restrained to prevent the melting of the DPF 13.

Figure 7:
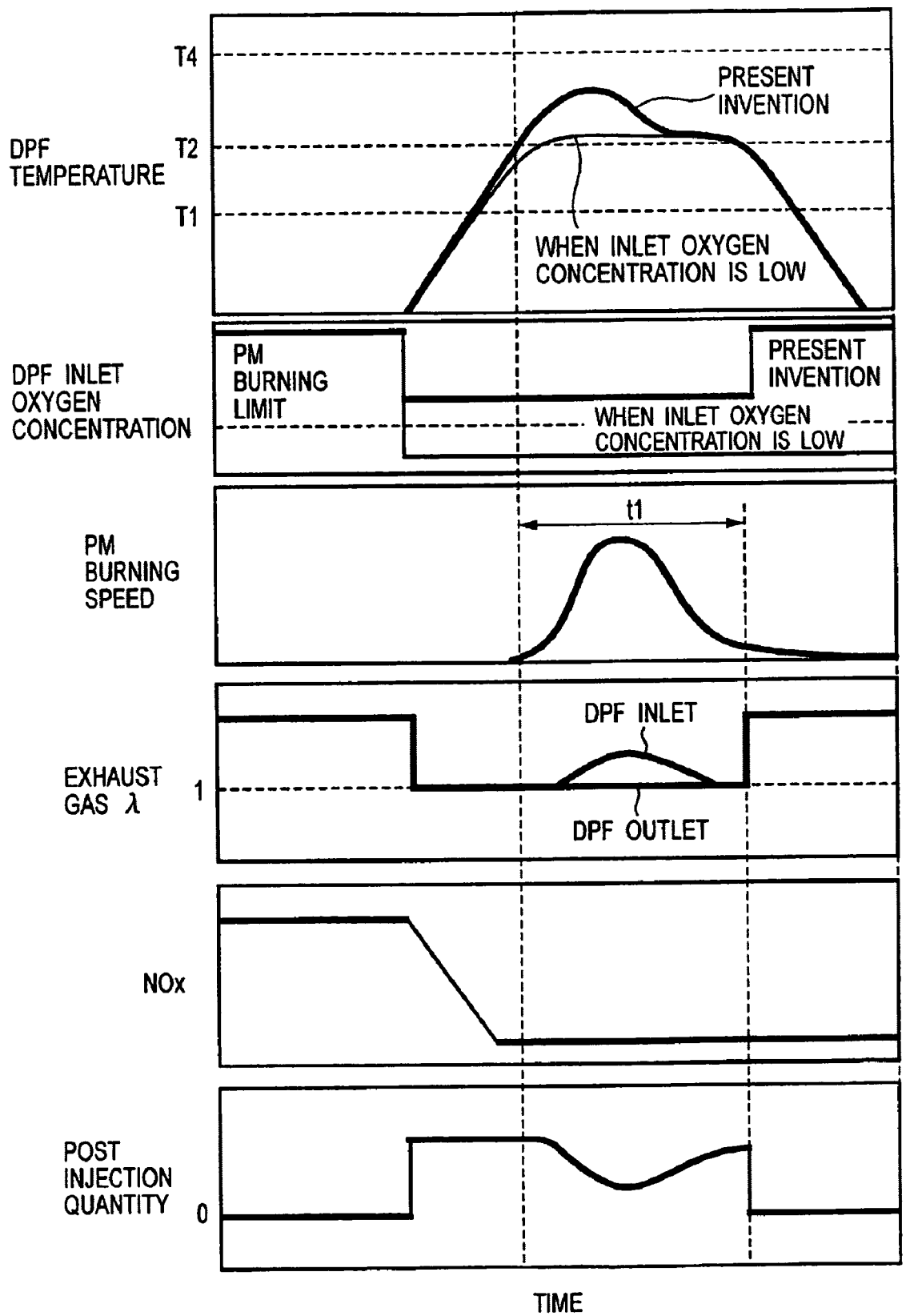
FIG. 7 is a time chart showing an operation of the first embodiment.

A basic operation by the above control according to the present embodiment, is shown in FIG. 7.

When it is the regeneration timing wherein the accumulated PM amount of the DPF 13 exceeds the predetermined amount, the temperature of the DPF 13 is raised by the post injection. At this time, if the post injection amount is adjusted so that the DPF outlet $\lambda=1$, and the DPF 13 temperature is raised to T2 at which the PM can be burned, the burning of the PM is started, as long as the oxygen concentration at the inlet of the DPF 13 is sufficient, as shown by the bold line in FIG. 7. Also, since the oxygen concentration at the inlet of the DPF is restrained by the intake throttling, there is no possibility that the DPF temperature will be raised more than necessary. If the DPF temperature is raised in the condition of low oxygen concentration at the inlet of the DPF, even if the DPF temperature reaches T2, the PM burning is not performed as shown by the thin line in FIG. 7.

The oxygen concentration sensor 24 is disposed on the outlet side of the DPF 13 and the post injection is performed while feedback controlling the DPF outlet λ, so that Nox during regeneration is treated with the three-way function by a precious metal catalyst and the emission performance is improved.

Further, as shown in FIG. 7, If the post injection is reduced corresponding to the oxygen amount consumed by the regeneration of the PM in the DPF 13, it becomes possible that the post injection amount and the fuel economy degradation is restrained, and also NOx, CO, and HC are purified by effecting sufficiently the three-way performance.

Next, a second embodiment according to the invention will be explained.

In the first embodiment, the exhaust gas air-fuel ratio at the outlet of the DPF 13 is controlled to the stoichiometric ratio by the control of the post injection and/or the amount thereof. In the second embodiment, the exhaust gas air-fuel ratio at the outlet of the DPF13 is controlled to the stoichiometric ratio, by controlling an EGR rate by an opening angle control of an EGR control valve 12.

Figure 8:
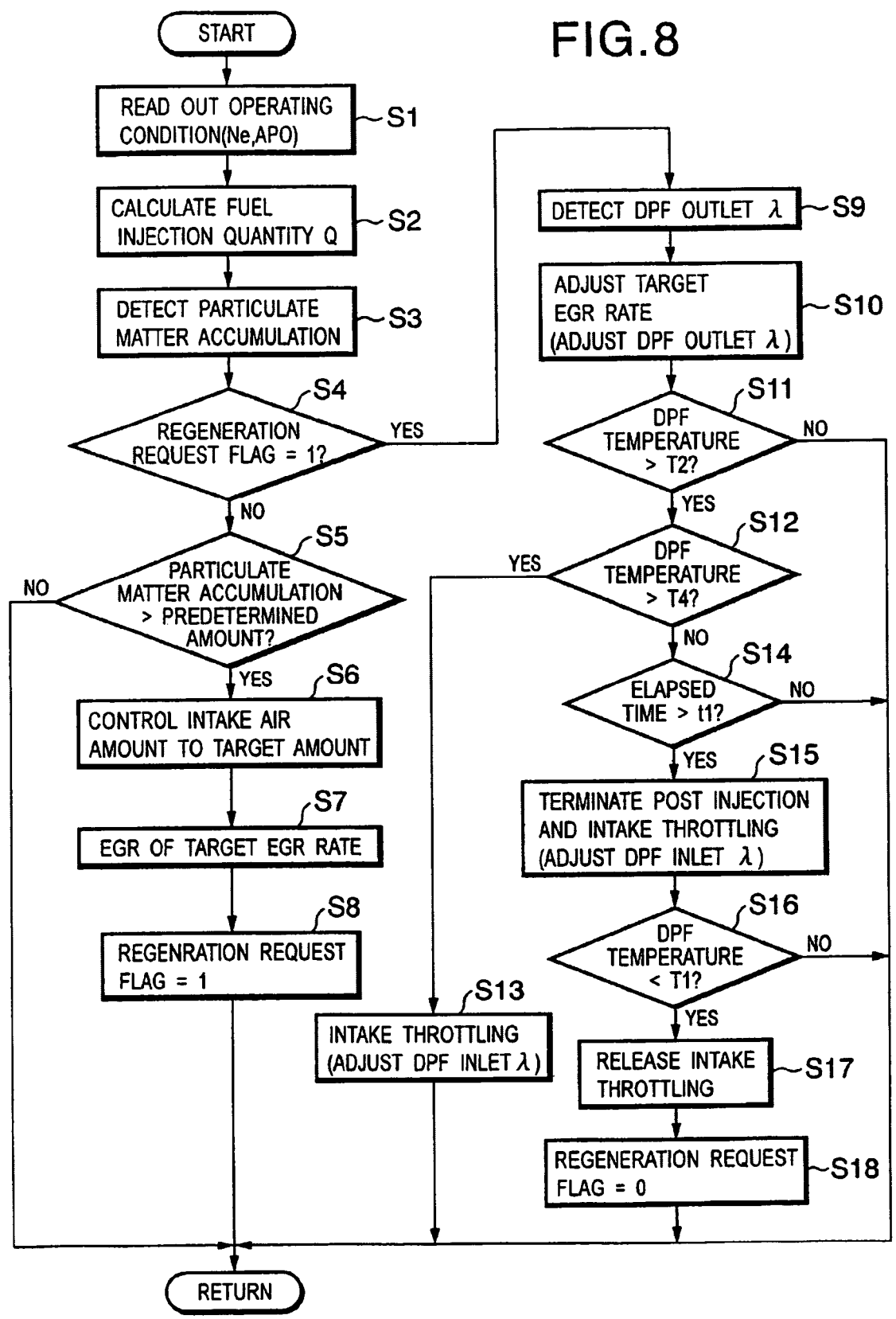
FIG. 8 is a flowchart of a DPF regeneration control in a second embodiment.

FIG. 8 is a flowchart of a DPF regeneration control in the second embodiment. This flowchart is different only in S7 and S10 from the first embodiment (FIG. 2), which only will be explained.

Figure 9:
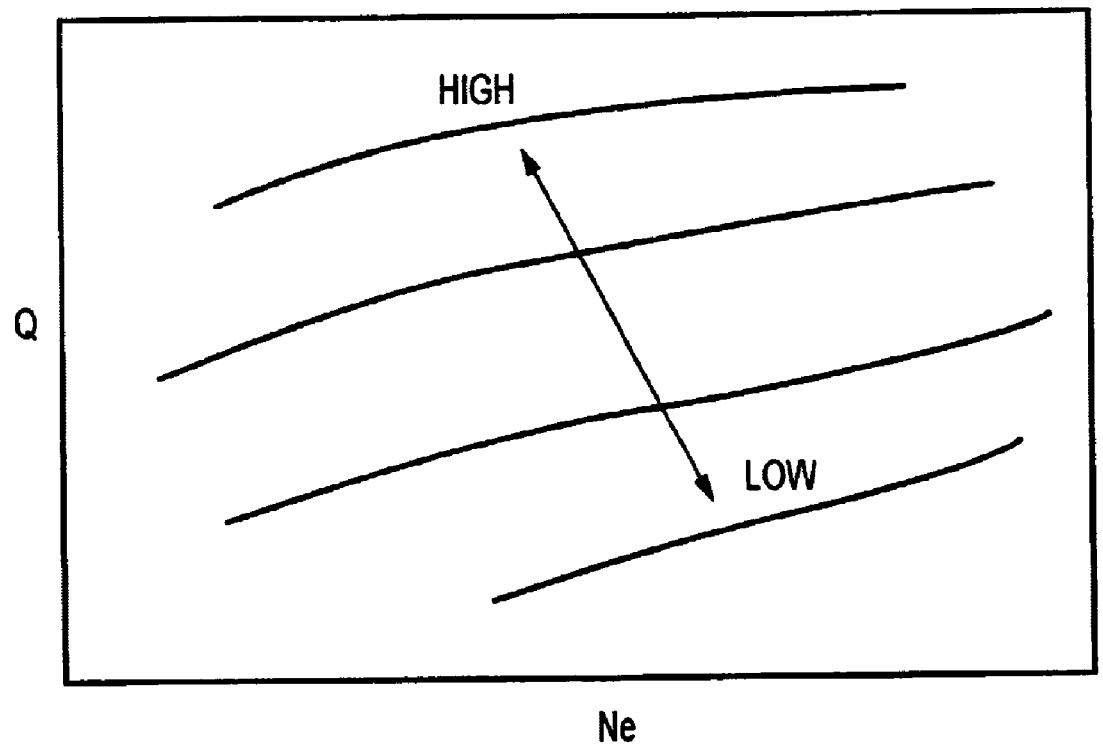
FIG. 9 is a map of a target EGR rate for the regeneration control.

At S7, a target EGR rate corresponding to the current operating condition (engine rotation speed Ne and fuel injection quantity 0) is determined from a target EGR rate map shown in FIG. 9, and the opening angle of EGR control valve 12 is controlled so as to obtain the determined target EGR rate. The target EGR rate at this time is set to a value so that the exhaust gas air-fuel ratio at the outlet of the DPF 13 is the stoichiometric ratio (DPF outlet λ=1), and also that the exhaust gas temperature enabling the regeneration of the DPF 13 is realized.

At S10, the EGR rate is feedback controlled based upon the exhaust gas air-fuel ratio (λ) at the outlet of the DPF 13 detected by the oxygen concentration sensor 24 so that the exhaust gas air-fuel ratio becomes the stoichiometric ratio.

The control of the exhaust gas air-fuel ratio at the outlet of the DPF 13 can be performed based upon the post injection timing or the intake throttling, instead of the post injection amount in the first embodiment and EGR in the second embodiment. Similarly, the control of the oxygen concentration at the inlet of the DPF 13, can be performed based on the main injection amount, the main injection timing, the post injection amount, the post injection timing, and EGR, other than the intake throttling in the first and second embodiments.

Next, a third embodiment according to the invention will be explained.

Figure 10:
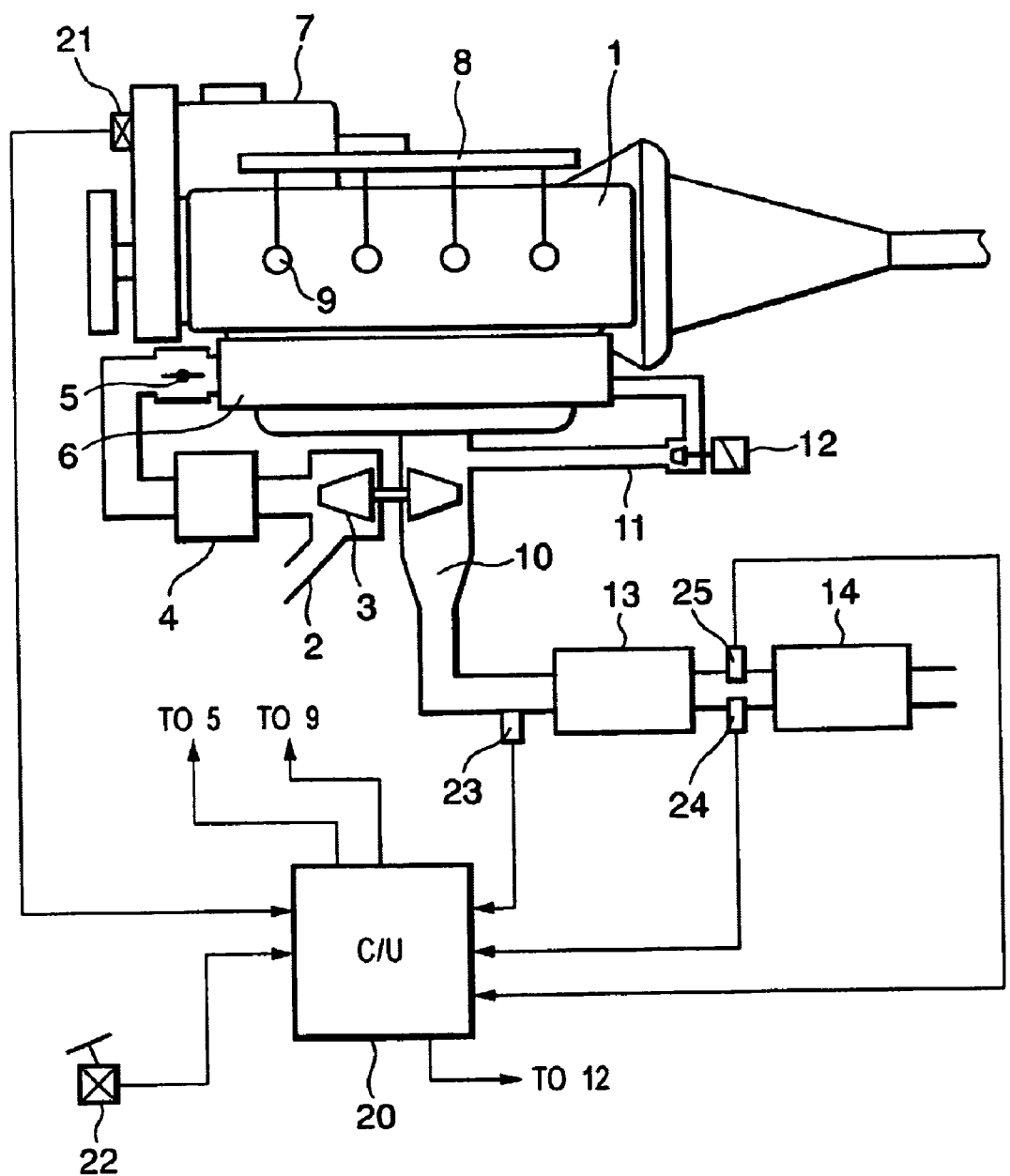
FIG. 10 is a system diagram of an engine in a third embodiment.

FIG. 10 is a system diagram of a diesel engine showing the third embodiment according to the present invention, a different point of the second embodiment from the first embodiment is that an NOx trap catalyst 14 is disposed on the downstream side of the DPF 13 with the three-way function on the exhaust passage 10, which traps Nx when the air-fuel ratio of the exhaust gas flowing thereto is lean, and when it is the stoichiometric ratio or rich, eliminates and purifies NOx.

Figure 11:
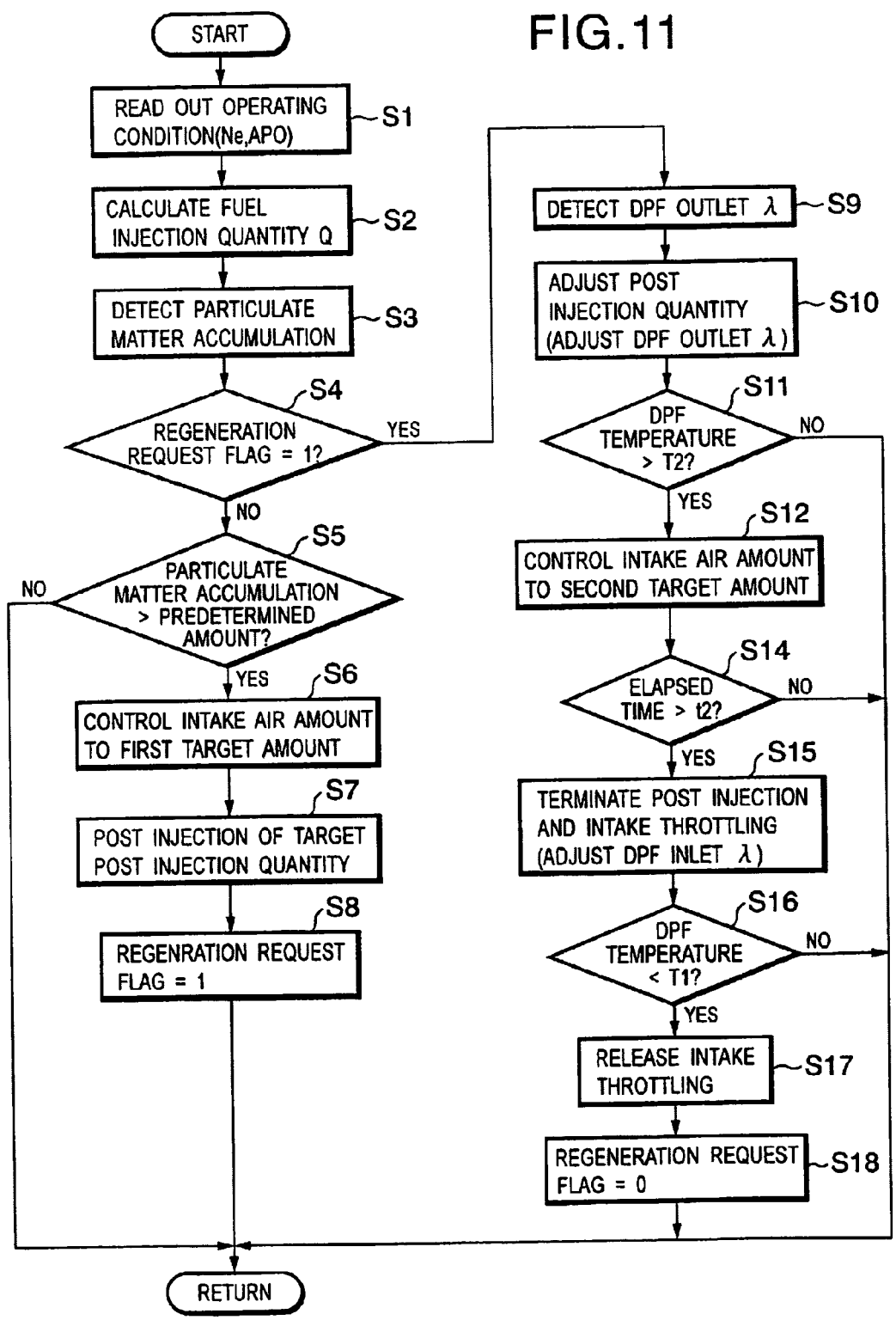
FIG. 11 is a flowchart of a DPF regeneration control in the third embodiment.

FIG. 11 is a flowchart of a DPF regeneration control in the third embodiment. This flowchart is different only in S6, S11, S12, and S16 from the first embodiment (FIG.), which will be explained.

Figure 12:
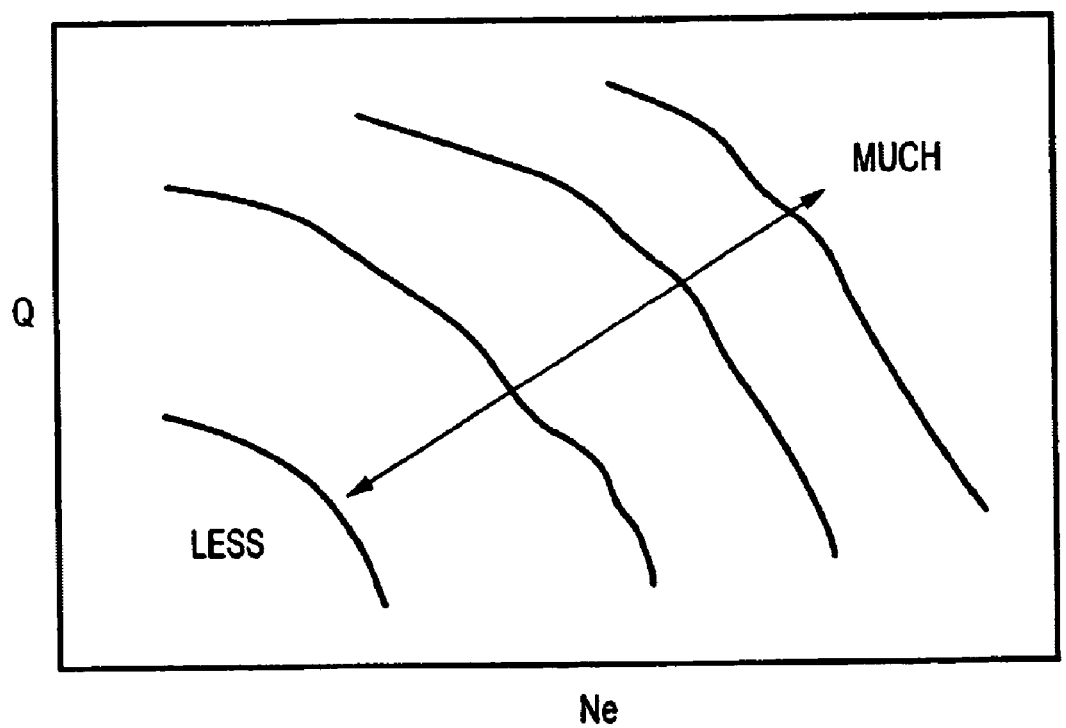
FIG. 12 is a map of a target intake air amount for rapid temperature rise of a DPF.

At S6, the intake air amount is adjusted by controlling the intake air throttle valve 5 to start the regeneration of the DPF 13. In order to promote the temperature rise of the DPF 13, the intake air amount is made large so that the oxygen concentration at the inlet of the DPF 13 becomes large to the extent that the DPF outlet λ is stoichiometric. For this purpose, a target intake air amount (first target value) corresponding to the current operating condition (engine rotation speed Ne and fuel injection quantity Q) is determined from a target intake air amount map for the rapid temperature rise of the DPF shown in FIG. 12 and the opening angle of the intake air throttle valve 5 is adjusted so as to obtain the determined target value. In this case, it is possible that an oxygen concentration sensor is disposed at the inlet of the DPF, and the intake throttling is adjusted so as to obtain the target oxygen concentration.

Accordingly, until the temperature at which the burning of PM will not start, much oxygen and the fuel by the post injection are supplied to the DPF 13, to oxidize the fuel post-injected to the DPF 13 at once, thereby enabling to accelerate temperature rise of the DPF 13.

At S11, by detecting the temperature of the DPF 13 (herein, exhaust gas temperature on the outlet side of the DPF), it is judged whether or not it reaches a temperature T3 (=T2) at which the PM can be burned and also a sulfur content accumulated on the NOx trap catalyst 14 can be removed. Since the temperature at which the sulfur content can be removed is usually lower than that at which the PM can be burned, then, herein T3=T2.

At S12, since the temperature of the DPF 13 has reached a state suitable for the PM burning where the temperature of the DPF 13 is T3 or above, the rapid temperature rise is ended and the intake air amount is made a little so that the oxygen concentration at the inlet of the DPF 13 becomes relatively small. For this purpose, a target intake air amount (second target value) is determined using the target intake air amount map shown in FIG. 4 and the opening angle of the intake air throttle valve 5 is controlled so as to obtain the determined target intake air amount.

Figure 13:
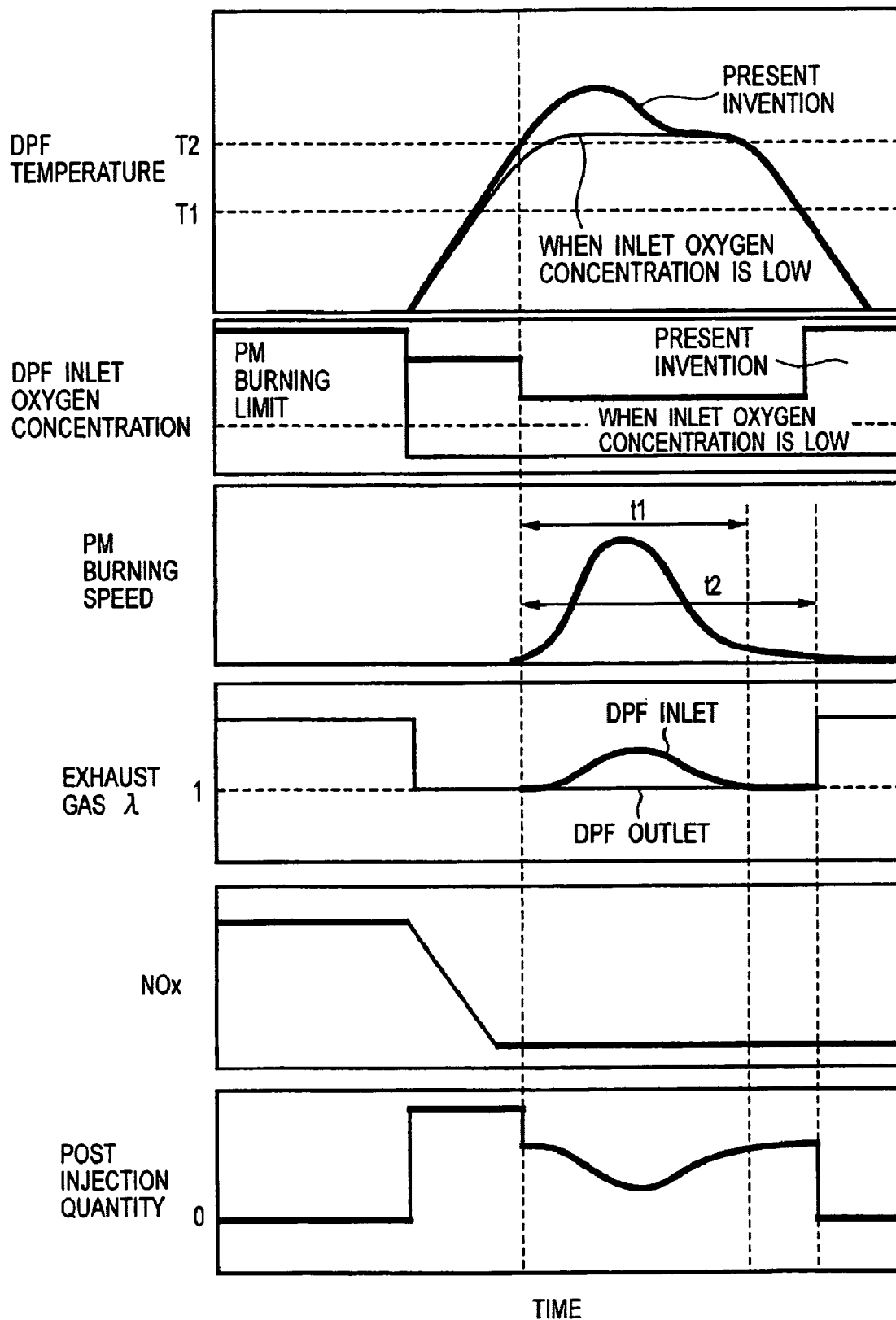
FIG. 13 is a time chart showing an operation of the third embodiment.

At S14, an elapsed time in this condition is detected. When it is a predetermined time t2 or less, the control returns. While, when it exceeds the predetermined time t2, the control goes to S15. Accordingly, while maintaining the predetermined time t2, the burning condition of the PM, and the removal condition of the sulfur content, the regeneration of the DPF 13 and the sulfur poisoning removal of NOx trap catalyst 14 are performed. The predetermined time t2 herein is a period of time required to burn the PM accumulated in the DPF 13 and to remove the sulfur content accumulated on the NOx trap catalyst 14, and is set as shown in FIG. 13 with respect to t1 in the first embodiment.

Since, in this embodiment, it is judged the regeneration timing when the accumulated PM amount in the DPF 13 reaches the predetermined constant amount, it can be assumed that the accumulated PM amount at the regeneration timing is the predetermined constant amount Accordingly, the time required for burning the PM can be set as a constant value, but a degree of the sulfur poisoning depends upon a sulfur density in the fuel. As the sulfur density gets higher, the sulfur poisoning is more likely to occur. Therefore, it is required to increase t2 as the sulfur density gets higher. Accordingly, t2 may be set in accordance with the sulfur density in the fuel.

Particularly, according to this embodiment, by disposing the NOx trap catalyst 14 in the exhaust passage 10, it becomes possible to perform the purification of NOx in the lean atmosphere other than the DPF 13 regeneration timing, as well as the purification of NOx during the regeneration due to the three-way effect by the catalyst carried on the DPF 13. Further, since the exhaust gas air-fuel ratio during the DPF 13 regeneration is the stoichiometric ratio, the NOx trap catalyst 14 is disposed downstream of the DPF 13 or carried on the DPF 13, so that, even when the NOx trap catalyst 14 is poisoned with the sulfur in the lean atmosphere, the DPF can be regenerated and at the same time the sulfur poisoning can be removed.

Moreover, according to this embodiment, the filter temperature detector (exhaust gas temperature sensor 25) is equipped and the oxygen concentration is controlled corresponding to the DPF temperature during the regeneration so that the oxygen concentration in the exhaust gas at the inlet of the DPF 13 gets higher when the DPF temperature is low, hence the following effects can be obtained. Namely, until the temperature of the DPF 13 reaches the temperature (T2) at which the PM trapped in the DPF 13 starts to be burned, the sooner the temperature rise of the DPF 13 is, the better it is. Therefore, by controlling the oxygen concentration of the DPF 13 inlet corresponding to the DPF temperature, the oxygen concentration of the DPF 13 inlet can be controlled to get the maximum temperature rise until the DPF 13 temperature reaches the burning start temperature (T2) of the PM and accordingly, the regeneration of the DPF 13 can be performed in a short time.

The entire contents of basic Japanese Patent Application No. 2001-121481 filed on Apr. 19, 2001, a priority of which is claimed, are herein incorporated by reference.

While only selected embodiments have been chosen to illustrate the present invention, it will be apparent to a person skilled in the art from this disclosure that various changes and modifications will occur herein without departing from the scope of the invention as defined in the accompanied claims. Furthermore, the foregoing description of the embodiments according to the present invention are provided for illustration only, and not for the purpose of limiting the invention as defined by the accompanied claims and their equivalents.

Industrial Applicability

According to the present invention, as explained above, at the regeneration of a PM trap filter, the PM can be properly burned and removed, and also NOx in addition to HC and CO are purified, thereby enabling to achieve the improvement of emission performance. Accordingly, the present invention has a wide range of industrial applicability.

The invention claimed is:

1. An exhaust gas purification apparatus for an internal combustion engine, comprising:
   a filter disposed in an exhaust passage and arranged in fluid communication with the internal combustion engine, that traps particulate matter in exhaust gas in the exhaust passage;
   a three-way catalyst, carried on the filter; and
   a control unit,
   wherein the exhaust passage is shaped such that all of the exhaust gas always passes through the filter and the three-way catalyst before exiting from the exhaust passage, and
   wherein the control unit is configured to simultaneously perform regeneration of the filter to remove accumulated particulate matter and to purify the three-way catalyst, by controlling at least one engine operating parameter related to combustion of the internal combustion engine, such that exhaust gas flowing out of the internal combustion engine has a lean air-fuel ratio and the exhaust gas flowing into the filter has a lean air-fuel ratio and the exhaust gas flowing out of the filter has a substantially stoichiometric air-fuel ratio.

2. An exhaust gas purification apparatus for an internal combustion engine according to claim 1,
   wherein the control unit controls the air-fuel ratio of the exhaust gas at the outlet of the filter by controlling at least one of post injection amount, post injection timing, exhaust gas recirculation, and intake air throttling.

3. An exhaust gas purification apparatus for an internal combustion engine according to claim 1, further comprising:
   an NOx trap catalyst disposed in the exhaust passage, that traps NOx when the air-fuel ratio of the exhaust gas is lean, and eliminates and purifies the trapped NOx when the air-fuel ratio is the stoichiometric ratio or rich.

4. An exhaust gas purification apparatus for an internal combustion engine according to claim 1,
   wherein, at times other than during regeneration of the filter, the control unit assumes that the air-fuel ratio of the exhaust gas at the outlet of the filter is equivalent to an air-fuel ratio of the exhaust gas inside the filter.

5. An exhaust gas purification apparatus for an internal combustion engine according to claim 1, further comprising a filter temperature detector positioned downstream of the filter, wherein the filter temperature detector is positioned to contact the exhaust gas before the exhaust gas encounters a junction or other components in the exhaust passage.

6. An exhaust gas purification apparatus for an internal combustion engine according to claim 1, further comprising an oxygen concentration sensor positioned downstream of the filter, wherein the oxygen concentration sensor is positioned to contact the exhaust gas before the exhaust gas encounters a junction or other components in the exhaust passage.

7. An exhaust gas purification apparatus for an internal combustion engine according to claim 1,
   wherein the control unit further controls an oxygen concentration of the exhaust gas at an inlet of the filter during the regeneration of the filter.

8. An exhaust gas purification apparatus for an internal according to claim 7,
   wherein the control unit controls the oxygen concentration of the exhaust gas at the inlet of the filter based on an amount of the particulate matter trapped in the filter.

9. An exhaust gas purification apparatus for an internal combustion engine according to claim 7, further comprising:
   a filter temperature detector that detects a filter temperature,
   wherein, during the regeneration of the filter, the control unit increases the oxygen concentration of the exhaust gas at the inlet of the filter when the filter temperature is below a predetermined value.

10. An exhaust gas purification apparatus for an internal combustion engine according to claim 7, further comprising:
    a filter temperature detector that detects a filter temperature,
    wherein, during the regeneration of the filter, the control unit lowers the oxygen concentration of the exhaust gas at the inlet of the filter when the filter temperature during the regeneration exceeds predetermined value.

11. An exhaust gas purification apparatus for an internal combustion engine according to claim 7,
    wherein the control unit controls the oxygen concentration of the exhaust gas at the inlet of the filter by at least one of intake throttling, main injection amount, main injection timing, post injection amount, post injection timing, and exhaust gas recirculation.

12. An exhaust gas purification apparatus for an internal combustion engine, comprising:

a filter disposed in an exhaust passage arranged in fluid communication with the internal combustion engine, that traps particulate matter in exhaust gas in the exhaust passage;

a three-way catalyst, carried on the filter; and control means for simultaneously performing regeneration of the filter to remove accumulated particulate matter and for purifying the three-way catalyst, by controlling at least one engine operating parameter related to combustion of the internal combustion engine, such that exhaust gas flowing out of the internal combustion engine has a lean air-fuel ratio and the exhaust gas flowing into the filter has a lean air-fuel ratio and the exhaust gas flowing out of the filter has a substantially stoichiometric air-fuel ratio;

wherein the exhaust passage is shaped such that all of the exhaust gas always passes through the filter and the three-way catalyst before exiting from the exhaust passage.

13. An exhaust gas purification method for an exhaust gas purification apparatus for an internal combustion engine, wherein the exhaust gas purification apparatus comprises:

a filter disposed in an exhaust passage arranged in fluid communication with the internal combustion engine, that traps particulate matter in exhaust gas in the exhaust passage, a three-way catalyst carried on the filter, and a control unit, wherein the exhaust passage is shaped such that all of the exhaust gas always passes through the filter and the three-way catalyst before exiting from the exhaust passage, the method comprising:

simultaneously performing regeneration of the filter to remove accumulated particulate matter and purification of the three-way catalyst, by controlling at least one engine operating parameter related to combustion of the internal combustion engine, such that exhaust gas flowing out of the internal combustion engine has a lean air-fuel ratio and the exhaust gas flowing into the filter has a lean air-fuel ratio and the exhaust gas flowing out of the filter has a substantially stoichiometric air-fuel ratio.

14. A method according to claim 13, further comprising: detecting an exhaust gas pressure at an inlet side of the filter.

15. A method according to claim 13, further comprising: detecting an exhaust gas temperature at an outlet side of the filter.

16. A method according to claim 13, wherein the step of maintaining comprises detecting at least one of an exhaust gas pressure at an inlet side of the filter, an oxygen concentration in the exhaust gas at an outlet side of the filter, and an exhaust gas temperature at an outlet side of the filter, and outputting a command signal from the control unit to (i) a fuel injection valve to control fuel injection quantities and timing, (ii) an opening angle command signal to the intake throttle valve, or (iii) an opening angle command signal to an EGR control valve.

17. A method according to claim 13, wherein the step of maintainihg comprises detecting a temperature of the filter, and lowering the exhaust gas oxygen concentration at the inlet of the filter if the temperature of the filter exceeds a predetermined value.

18. A method according to claim 13, wherein the step of maintaining comprises detecting an oxygen concentration at the filter outlet, and controlling the concentration by sending a command signal from the control unit to change post injection timing, intake throttling, or post injection amount.

19. A method according to claim 13, further comprising:

detecting a temperature of the filter, and increasing the oxygen concentration in exhaust gas at the inlet of the filter if the temperature is below a predetermined value.

20. A method according to claim 13, further comprising purifying HG, CO and NOx within the filter.

21. A method according to claim 13, further comprising:

detecting an oxygen concentration in the exhaust gas at an outlet side of the filter.

22. A method according to claim 21, wherein the oxygen concentration detection step is performed at a location downstream of the filter before the exhaust gas flowing from the filter encounters a junction or other components in the exhaust passage.

23. A method according to claim 13, further comprising:

detecting a temperature of the filter.

24. A method according to claim 23, wherein the temperature detection step is performed at a location downstream of the filter before the exhaust gas flowing from the filter encounters a junction or other components in the exhaust passage.

25. A control unit for an exhaust gas purification system, comprising:

a sensor input; and a signal output;

wherein the control unit is configured to simultaneously perform regeneration of a filter to remove accumulated particulate matter and to purify of a three-way catalyst, by controlling at least one engine operating parameter related to combustion of an internal combustion engine, such that exhaust gas flowing out of the internal combustion engine has a lean air-fuel ratio and the exhaust gas flowing into the filter has a lean air-fuel ratio and the exhaust gas flowing out of the filter has a substantially stoichiometric air-fuel ratio;

wherein the exhaust gas purification system comprises an exhaust passage shaped such that all of the exhaust gas always passes through the filter and the three-way catalyst before exiting from the exhaust passage.

26. A control method for an exhaust gas purification system of an internal combustion engine provided with a filter in an exhaust passage thereof and a three-way function catalyst on the filter, comprising:

simultaneously performing regeneration of the filter to remove accumulated particulate matter and purification of the three-way catalyst, by controlling at least one engine operating parameter related to combustion of the internal combustion engine, such that exhaust gas flowing out of the internal combustion engine has a lean air-fuel ratio and the exhaust gas flowing into the filter has a lean air-fuel ratio and the exhaust gas flowing out of the filter has a substantially stoichiometric air-fuel ratio;

wherein the exhaust passage is shaped such that all of the exhaust gas always passes through the filter and the three-way function catalyst before exiting from the exhaust passage.

* * * * *